(12) United States Patent
Seaman et al.

(10) Patent No.: US 9,133,784 B2
(45) Date of Patent: Sep. 15, 2015

(54) VEHICLE HAVING KEY-BASED PERFORMANCE MODE

(75) Inventors: Jeffrey Robert Seaman, Brownstown, MI (US); Aaron Anthony Bresky, St. Clair Shores, MI (US); Frank J. Desjarlais, Canton, MI (US); Shawn Carney, Ypsilanti, MI (US); Daniel Grube, Dexter, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1235 days.

(21) Appl. No.: 13/018,801

(22) Filed: Feb. 1, 2011

(65) Prior Publication Data

US 2012/0197508 A1 Aug. 2, 2012

(51) Int. Cl.
*G06F 19/00* (2011.01)
*G06G 7/70* (2006.01)
*F02D 41/08* (2006.01)
*F02D 37/02* (2006.01)
*F16H 61/02* (2006.01)
*F02D 41/02* (2006.01)
*F02D 41/12* (2006.01)
*F02D 31/00* (2006.01)
*F02D 41/00* (2006.01)
*F02D 41/14* (2006.01)
*F16H 59/50* (2006.01)
*F16H 59/02* (2006.01)

(52) U.S. Cl.
CPC ............... *F02D 41/08* (2013.01); *F02D 37/02* (2013.01); *F16H 61/0213* (2013.01); *F02D 31/003* (2013.01); *F02D 41/0235* (2013.01); *F02D 41/12* (2013.01); *F02D 2041/001* (2013.01); *F02D 2041/1422* (2013.01); *F02D 2200/021* (2013.01); *F02D 2200/602* (2013.01); *F02D 2200/604* (2013.01); *F16H 59/50* (2013.01); *F16H 2059/0252* (2013.01); *F16H 2061/0227* (2013.01); *F16H 2306/14* (2013.01)

(58) Field of Classification Search
CPC . F02D 41/021; F02D 2250/18; F02D 41/263; F02N 11/0807; B60R 25/04
USPC ............... 701/1, 99, 101, 110, 111, 112, 113, 701/115, 116
See application file for complete search history.

(56) References Cited

U.S. PATENT DOCUMENTS 4,107,776 A * 8/1978 Beale .............................. 701/99
4,986,227 A * 1/1991 Dewey, III ................. 123/90.16

(Continued)

OTHER PUBLICATIONS

Chinese Office Action for Chinese Application No. 2012100221734 dated Mar. 2, 2015.

*Primary Examiner* — Mahmoud Gimie
*Assistant Examiner* — Sizo Vilakazi
(74) *Attorney, Agent, or Firm* — Julia Voutyras; Brooks Kushman P.C.

(57) ABSTRACT

A system or method for controlling a vehicle having a normal operating mode and a performance operating mode include detecting a removable key unique to each vehicle associated with the performance operating mode, operating the vehicle in the performance operating mode in response to detecting the removable key, and operating the vehicle in the normal operating mode otherwise. Operation in performance or track mode may include adjusting valve timing using a variable cam timing device, adjusting idle speed control, adjusting torque response, and/or enhancing engine braking. Performance mode operation may also disable one or more features, such as a transmission skip shift feature.

13 Claims, 3 Drawing Sheets

(56) References Cited

U.S. PATENT DOCUMENTS

| | | | |
|---|---|---|---|
| 5,513,107 A * | 4/1996 | Gormley | 701/48 |
| 5,614,666 A * | 3/1997 | Hara et al. | 73/114.25 |
| 6,198,996 B1 * | 3/2001 | Berstis | 701/36 |
| 7,424,361 B2 * | 9/2008 | Masuda et al. | 701/101 |
| 8,487,740 B2 | 7/2013 | Tsuruta et al. | |
| 2006/0259287 A1 * | 11/2006 | Jacquelin et al. | 703/8 |
| 2009/0143961 A1 * | 6/2009 | Gaviani et al. | 701/110 |
| 2010/0211254 A1 * | 8/2010 | Kimura et al. | 701/29 |
| 2012/0004933 A1 * | 1/2012 | Foladare et al. | 705/4 |

* cited by examiner

VEHICLE HAVING KEY-BASED PERFORMANCE MODE

TECHNICAL FIELD

The present disclosure relates to selection or activation of a performance mode in an engine/vehicle.

BACKGROUND

Vehicle manufacturers design or select various aesthetic and functional characteristics of a vehicle to provide a characteristic "look and feel" desired by corresponding target groups of consumers. In addition to structural hardware components, vehicle engine, transmission, suspension, steering and other systems may be calibrated to meet desired performance and fuel economy goals consistent with the desired "look and feel". Vehicles may include special-purpose operating modes selectable by the operator for a particular application. For example, vehicles may include a trailering mode, an off-road or 4×4 mode, economy mode, performance mode, etc. A corresponding button or switch on the dashboard or gear selector may be provided to activate the special-purpose operating mode. In one example of a performance mode selected by a corresponding pushbutton or switch, automatic transmission shift points and shift feel are adjusted to extend shift points and provide a more aggressive or faster shift. To reduce the development time required to provide a complete performance calibration for the engine or transmission, this may be accomplished by providing a performance adjustment factor used to adjust corresponding values of the operating parameters stored in memory.

While use of dashboard switches or other hardware installed in the vehicle to select or activate a special-purpose operating mode is convenient for many applications, this strategy requires modification of the vehicle dashboard, console, gear selector, etc. and may be cost-prohibitive for low volume applications. In addition, the special purpose mode activation switch is integrated into the vehicle design such that the special purpose mode must be ordered/specified during the vehicle build or included in all similar vehicles. Likewise, if the activation or control switch is permanently installed in the vehicle, the special purpose mode is available to any vehicle operator.

SUMMARY

A system and method for controlling a vehicle having a normal operating mode and a performance operating mode include detecting a removable key unique to each vehicle associated with the performance operating mode, operating the vehicle in the performance operating mode in response to detecting the removable key, and operating the vehicle in the normal operating mode otherwise. In one embodiment, the removable key comprises an ignition key detected using RFID to distinguish between a normal key and a performance key when a key is inserted into the ignition key slot. In another embodiment, the removable key comprises a wireless device that communicates a key serial number or code to the vehicle. In yet another embodiment, a password or identification code is entered using a touch screen or similar device to enable the performance mode.

Embodiments according to the present disclosure include first and second cam timing calibrations for operating in normal and performance modes to provide increased horsepower as well as a lopey idle sound and feel often associated with traditional performance vehicles. In addition to valve timing, performance mode operation may include enhanced engine braking and more aggressive accelerator pedal response, for example.

In one embodiment, a method for controlling a vehicle having a multiple cylinder internal combustion engine operable in normal and performance operating modes includes detecting insertion of an ignition key into a corresponding ignition key slot, determining whether the ignition key includes an identifier to enable operation in the performance operating mode, monitoring at least one engine operating parameter, and operating the engine in the performance operating mode if the ignition key includes the identifier and the at least one engine operating parameter satisfies an associated performance operating mode entry condition, and operating the engine in the normal operating mode otherwise.

Embodiments according to the present disclosure include a system for controlling a vehicle having a multiple cylinder internal combustion engine operable in a normal mode and a performance mode that includes an ignition key slot, at least one sensor that monitors at least one engine operating parameter, and a controller in communication with the ignition key slot and the at least one sensor, the controller operating the engine in the performance operating mode if an ignition key inserted into the ignition key slot includes a performance mode identifier and the at least one engine operating parameter satisfies an associated performance operating mode entry condition, and operating the engine in the normal operating mode otherwise.

Various embodiments according to the present disclosure provide associated advantages. For example, selective operation in a performance or track mode allows various compromises to drivability to improve performance on a race track or closed course that may otherwise be undesirable to customers using the vehicle in typical driving scenarios, such as commuting, running errands, or longer road trips. Performance mode enhancements to engine braking, for example, may produce unacceptable noise, vibration, and harshness (NVH) during normal vehicle use. Use of a selectable performance mode accommodates customer expectations for both enhanced performance in the track mode and more acceptable NVH when operating in the normal mode. Use of a removable ignition key or similar device to enable operation in the performance mode or track mode facilitates control of access to the performance mode relative to a permanently installed vehicle switch. An separate ignition key that enables operation in performance mode may also reduce costs associated with lower volume production vehicles. In addition, the performance mode key and associated operation could be provided as an option without custom designs or parts for the vehicle dashboard, console, or other interior components.

DETAILED DESCRIPTION

Detailed embodiments of the present disclosure are illustrated and described herein; however, it is to be understood that the disclosed embodiments are merely exemplary and a system or method according to the present disclosure may be embodied in various and alternative forms other than those explicitly illustrated and/or described. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the present disclosure.

As those of ordinary skill in the art will understand, various features of the embodiments as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
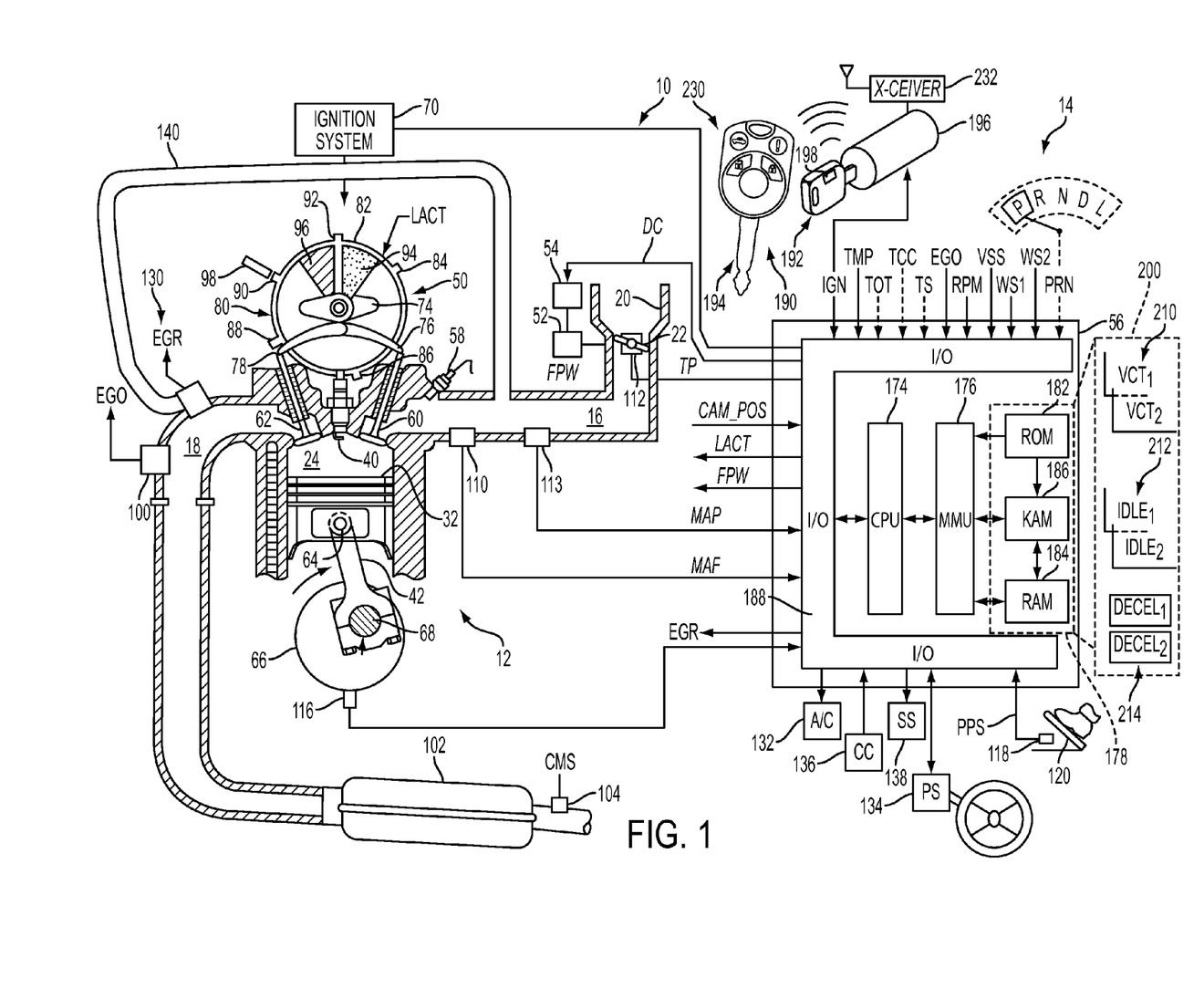
FIG. 1 is a block diagram illustrating operation of a system or method for controlling a vehicle having a performance operating mode according to embodiments of the present disclosure.

Referring now to FIG. 1, a vehicle 10 includes a multiple cylinder internal combustion engine 12 and an associated vehicle control system 14. As illustrated, control system 14 is in communication with various sensors and actuators that may be used in operating the vehicle in a normal mode or a performance mode based on a corresponding ignition key 190, 192 used to start the engine 12. As described in greater detail herein, ignition keys 190, 192 may include electronics for wirelessly transmitting a key serial number or code to enable engine starting and operating in normal or performance mode depending on the key code or serial number. For example, a wireless key or key fob may be used for keyless ignition or push-start ignition applications where the ignition "key" does not include traditional key features, such as ridges, slots, dimples, etc. with the key code or serial number wirelessly communicated to the vehicle when the key is within a predetermined range of the vehicle.

As also shown in FIG. 1, Engine 12 includes an intake manifold 16, an exhaust manifold 18, a throttle body 20, a throttle plate 22, multiple cylinders represented by cylinder 24 with corresponding pistons contained therein as represented by piston 32 and associated spark plugs as represented by spark plug 40, connecting rod assemblies represented by assembly 42, and variable cam timing (VCT) mechanism 50.

In operation, intake manifold 16 is coupled to throttle body 20 with intake air modulated via electronically controlled throttle plate 22. Throttle plate 22 is controlled by electric motor 52 in response to a signal received from ETC driver 54 based on a corresponding control signal (DC) received from a controller 56 generated in response to a requested torque or power via position of accelerator pedal 120 as determined by pedal position sensor 118. As described in greater detail herein, one or more operating or control parameters associated with the response of the throttle plate 22 to a corresponding change in position of accelerator pedal 120 may be modified to provide enhanced engine braking and more aggressive acceleration when operating in a performance mode according to various embodiments of the present disclosure.

A throttle plate position sensor 112 provides a feedback signal (TP) for closed loop control of throttle plate 22. As known by those of ordinary skill in the art, the closed loop control system may include gains or time constants that may be adjusted or modified when operating in a performance mode relative to values used for operation in a normal operating mode for substantially identical operating conditions.

Air inducted into throttle body 20 passes through intake manifold 16 past mass airflow sensor 110, which provides a corresponding signal (MAF) indicative of the mass airflow to controller 56 for use in controlling the engine/vehicle. A manifold absolute pressure (MAP) sensor 113 may alternatively (or in combination) provide a signal indicative to the manifold pressure for use in controlling the engine/vehicle. In addition, controller 56 may communicate with various other sensors to monitor engine operating conditions, such as crankshaft position sensor 116, which may be used to determine engine rotational speed and to identify cylinder combustion based on an absolute, relative, or differential engine rotation speed.

An exhaust gas oxygen sensor 100 provides a signal (EGO) to controller 56 indicative of whether the exhaust gases are lean or rich of stoichiometry. Depending upon the particular application, sensor 100 may provide a two-state signal corresponding to a rich or lean condition, or alternatively a signal that is proportional to the stoichiometry of the exhaust gases. This signal may be used to adjust the air/fuel ratio, or control the operating mode of one or more cylinders, for example. The exhaust gas is passed through the exhaust manifold and one or more catalysts 102 before being exhausted to atmosphere. An additional EGO sensor 104 may be positioned downstream of the catalyst(s) 102 and provide a corresponding catalyst monitor signal (CMS) to controller 56 used to monitor performance of catalyst(s) 102. EGO sensors 100, 104 and/or an optional temperature sensor may be used to detect when catalyst(s) 102 has reached a suitable operating temperature or light-off state. Catalyst operating state or temperature is one of the engine and/or vehicle operating parameters that may be monitored by an associated sensor and used as an entry or enabling condition for performance mode operation as described in greater detail herein. Other operating parameters that may be monitored and used as performance mode entry conditions may include engine coolant temperature, oil temperature, transmission oil temperature, ambient temperature, etc.

Each cylinder 24 communicates with intake manifold 16 and exhaust manifold 18 via one or more respective intake and exhaust valves represented by intake valve 60 and exhaust valve 62. Cylinder 24 includes a combustion chamber having an associated reciprocating piston 32 operably disposed therein. Piston 32 is connected to connecting rod assembly 42 via a wrist pin 64. Connecting rod 42 is further coupled to crankshaft 66 via a crankpin 68. Ignition timing for ignition of an air-fuel mixture within cylinder 24 is controlled via spark plug 40, which delivers an ignition spark responsive to a signal from distributorless ignition system 70. As well known in the art, ignition timing is typically measured in degrees based on angular position of crankshaft 66 relative to a position corresponding to top dead center (TDC), i.e. the highest point of piston 32 within cylinder 24. For the port fuel injection engine illustrated, intake manifold 16 includes a fuel injector 58 coupled thereto for delivering fuel in proportion to the pulse width of one or more signals (FPW) from controller 56. Fuel is delivered to fuel injector 58 by a conventional fuel system (not shown) including a fuel tank, fuel pump, and fuel rail, for example. Similar to the valve timing control described below, ignition timing and fueling may be controlled using calibration information stored in corresponding memory locations or look-up tables indexed by one or more operating conditions, such as engine speed, load, torque demand, temperature, etc. Separate look-up tables may be provided for operation in a normal operating mode and performance operating mode according to various embodiments of the present disclosure. As such, when operating in a normal operating mode, calibration values for fuel and ignition timing may be retrieved from corresponding memory locations or look-up tables for normal operation. Similarly, when operating in a performance mode, calibration values for fuel and ignition timing may be retrieved from corresponding performance mode memory locations or look-up tables. Alternatively, a scaling or adjustment factor or equation may be applied to calibration values obtained from the normal mode look-up table to generate a corresponding performance mode value. Although illustrated with respect to a port-injected spark-ignition engine, those of ordinary skill in the art will recognize that the teachings of the present disclosure may be applied to various other engine technologies.

As also shown in FIG. 1, engine 12 may include a device to alter or modify opening and/or closing times of engine intake valves 60 and/or exhaust valves 62. Various mechanical, electrical/electronic and hybrid devices may be used to adjust valve timing when operating in a performance mode according to embodiments of the present disclosure. In one embodiment, a variable cam timing (VCT) device or mechanism 50 is used to vary the actuation time of intake and exhaust valves 60, 62 for each cylinder 24. While the representative embodiment illustrated includes a VCT device 50 that operates to vary actuation time of both intake and exhaust valves, other applications or implementations may operate to vary the timing of only the intake valves 60 or only the exhaust valves 62. Engines having electromagnetic valve actuators may be controlled to change valve timing of only some of the valves or cylinders depending on the particular application and implementation.

VCT device 50 may be used to control the amount of residual gases remaining in cylinder 24, also referred to as internal EGR-effect, to enhance fuel economy and manage emissions. However, control of the internal EGR-effect by VCT device 50 is generally limited to low speed/load operating conditions. As such, engine 12 may include an EGR valve 130 controlled by controller 56 and disposed between engine exhaust manifold 18 and intake manifold 16. Control of EGR valve 130 may be modified when operating in performance mode according to various embodiments of the present disclosure to provide increased torque or horsepower, for example.

VCT mechanism 50 cooperates with corresponding lobes of a camshaft 74, which are shown communicating with rocker arms 76, 78 for variably actuating valves 60, 62. Camshaft 74 is directly coupled to housing 80, which forms a toothed cam wheel 82 having teeth 84, 86, 88, 90, 92. Housing 80 is hydraulically coupled to an inner shaft (not shown), which is in turn directly linked to camshaft 74 via a timing chain (not shown). Therefore, housing 80 and camshaft 74 rotate at a speed substantially equivalent to the inner camshaft. The inner camshaft rotates at a constant speed ratio relative to crankshaft 66. The position of camshaft 74 relative to crankshaft 66 can be varied by hydraulic pressure in advance chamber 94 and/or retard chamber 96. By allowing high-pressure hydraulic fluid to enter advance chamber 94, the relative relationship between camshaft 74 and crankshaft 66 is advanced. Thus, intake valve 60 and exhaust valve 62 open and close at a time earlier than normal relative to crankshaft 66. Similarly, by allowing high-pressure hydraulic fluid to enter retard chamber 96, the relative relationship between camshaft 74 and crankshaft 66 is retarded. Thus, intake valve 60 and exhaust valve 62 open and close at a time later than normal relative to crankshaft 66.

Teeth 84, 86, 88, 92 of cam wheel 82 are coupled to housing 80 and camshaft 74 and allow for measurement of relative position of camshaft 74 via cam timing sensor 98 which provides signal CAM_POS to controller 56. Tooth 90 is used for cylinder identification. As illustrated, teeth 84, 86, 88, 92 may be evenly spaced around the perimeter of cam wheel 82. Controller 56 sends control signal LACT to a conventional solenoid spool valve (not shown) to control the flow of hydraulic fluid into either advance chamber 94, retard chamber 96, or neither. Relative position of camshaft 74 can be measured in general terms, using the time, or rotation angle between the rising edge of a PIP signal and receiving a signal from one of teeth 84, 86, 88, 90, or 92 as is known.

Controller 56 has a microprocessor 174, also referred to as a central processing unit (CPU), in communication with memory management unit (MMU) 176. MMU 176 controls the movement of data among the various computer readable storage media 178 and communicates data to and from CPU 174. Computer readable storage media 178 preferably include volatile and nonvolatile storage in read-only memory (ROM) 182, random-access memory (RAM) 184, and keep-alive memory (KAM) 186, for example. KAM 186 may be used to store various operating variables or control system parameter values while CPU 174 is powered down. Computer-readable storage media 178 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions or code, used by CPU 174 in controlling the engine or vehicle into which the engine is mounted and for performing on-board diagnostic (OBD) monitoring of various engine/vehicle features. Computer-readable storage media 178 may also include floppy disks, CD-ROMs, hard disks, and the like.

CPU 174 communicates with various engine/vehicle sensors and actuators via an input/output (I/O) interface 188 that may be implemented as a single integrated interface providing various raw data or signal conditioning, processing, and/or conversion, short-circuit protection, and the like. Alternatively, one or more dedicated hardware or firmware chips may be used to condition and process particular signals before being supplied to CPU 174. Examples of items that may be directly or indirectly actuated under control of CPU 174, through I/O interface 188, are fuel injection timing, rate, and duration, throttle valve position, spark plug ignition timing (for spark-ignition engines), intake/exhaust valve timing and/or duration, front-end accessory drive (FEAD) components such as an alternator, air conditioning compressor 132, power steering (PS) 134, and the like. Various engine and/or vehicle accessories may also provide inputs and/or communicate with controller 56, such as cruise control (CC) 136 and manual transmission skip shift control (SS) 138. Various sensors communicating input through I/O interface 188 may be used to indicate crankshaft position (PIP), engine rotational speed (RPM), wheel speed (WS1, WS2), vehicle speed (VSS), coolant temperature (ECT), accelerator pedal position (PPS), ignition switch position or status (IGN), throttle valve position (TP), air temperature (TMP), exhaust gas oxygen (EGO) or other exhaust gas component concentration or presence, intake air flow (MAF), or catalytic converter performance (CMS), for example. For vehicles equipped with an automatic transmission, transmission gear or ratio (PRN), transmission oil temperature (TOT), transmission turbine speed (TS), and torque converter clutch status (TCC) may also be included.

Some controller architectures do not contain an MMU 176. If no MMU 176 is employed, CPU 174 manages data and connects directly to ROM 182, RAM 184, and KAM 186. Of course, more than one CPU 174 may be used to provide engine control and diagnostics and controller 56 may contain multiple ROM 182, RAM 184, and KAM 186 coupled to MMU 176 or CPU 174 depending upon the particular application.

Controller 56 includes software and/or hardware implementing control logic to control vehicle 10 to operate in one of a performance mode and a normal mode in response to detecting a removable key unique to each vehicle and having identification information associated with enabling the performance operating mode according to various embodiments of the present disclosure. When operating in performance mode, controller 56 provides control signals to VCT device 50 to alter timing of gas exchange valves 60 and/or 62 to increase engine torque and/or power. In addition, VCT device 50 may be controlled in combination with idle speed, fuel, and airflow to provide a lopey idle sound and feel characteristic of traditional performance vehicles having a performance camshaft. In contrast to traditional performance vehicles, the lopey idle is active only when the performance mode is enabled.

As also illustrated in FIG. 1, computer readable storage media 178 may include various calibration data and control parameters, generally represented at 200, associated with operation in a normal operating mode and a performance operating mode. As previously described, calibration data may be stored in associated cells or locations in memory indexed by one or more operating parameters and generally represented in single or multi-dimensional tables or maps, such as represented by VCT calibration tables 210 and idle speed calibration tables 212. As previously described, representative operating parameters that may be used to index look-up tables may include engine speed and load, vehicle speed, various temperatures (oil, coolant, ambient), requested torque, etc. Various control system parameters, such as gains, offsets, time constants, and the like associated with normal and performance operating modes may also be stored in computer readable storage media 178 as generally represented by engine braking or deceleration parameters 214.

In the embodiment of FIG. 1, at least two removable ignition keys 190, 192 associated with a performance operating mode and normal operating mode, respectively, are provided. Each key 190, 192 may include slots, ridges, dimples, etc. 194 to engage associated pins, tumblers, or switches when inserted into ignition key cylinder or socket 196 mounted within the vehicle steering column or dashboard, for example. In one embodiment, keys 190, 192 have the same slots, ridges, etc. and are distinguished by identification information associated with an electronic component(s) or device 198, such as a resistor, integrated circuit, or memory chip, for example, mounted on, or contained within, keys 190, 192. Alternatively, keys 190, 192 may have different slots, ridges, etc. used to identify the key as a performance mode key or normal mode key. Each ignition key 190, 192 may also include additional circuitry and/or transceivers with associated buttons 230 to provide remote operation of various vehicle functions, such as door lock/unlock, panic/emergency, remote start, trunk release, etc. As previously described, various embodiments may use a removable ignition key 190, 192 implemented by a wireless key fob or similar device that does not include any slots, ridges, etc. and is used in combination with a keyless or push-start ignition. Alternatively, or in combination, a serial number, password, permission, code, etc. may be manually entered by a vehicle operator using an associated touch screen or key panel to enable performance mode operation.

Information stored in, or associated with, electronic component(s) or device 198 may be used to uniquely identify the key and associate the key with a particular vehicle to provide passive vehicle security, for example. In addition, electronic component(s) 198 (or an additional electronic component) may be used to identify the key as a performance or track key 190 or a normal key 192. Some applications may also include an additional valet key (not shown) that provides limited functionality for one or more vehicle/engine functions and is identified by electronic component(s) 198. Alternatively, a particular ignition key or similar device may be identified by the absence of any electronic information. For example, performance key 190 may include electronic identification information and normal operating mode key 192 may be identified by the absence of detected electronic information.

Ignition cylinder or slot 196 may include an associated transceiver 232 to wirelessly communicate with electronic component(s) 198. Transceiver 232 may be implemented using a short-range communication technology, such as RFID technology, for example, so that transceiver 232 only detects information from the key inserted into ignition cylinder 196 and does not detect any other key that may be in close proximity, such as on the same key ring, for example. In one embodiment, electronic device 198 is mounted to be inserted into ignition cylinder 196 to provide short-range communication or direct conductive contact with electronic device 198, for example. For keyless ignition or push-start applications, an electronic device 198 associated with an ignition key fob may be automatically detected using longer range RFID technology or various other communication technology so that the ignition key fob does not have to be removed from operator clothing, for example, to enable performance mode and vehicle starting.

Controller 56 includes control logic to detect ignition key 190, 192 when within range, which may be only when inserted into a corresponding ignition key slot 196, for example. Alternatively, longer range detection capabilities may be provided for keyless ignition applications. Control logic within controller 56 determines whether the removable key 190, 192 includes an identifier to enable operation in the performance mode. An associated key may be paired with the vehicle to enable operation of performance mode during initial manufacturing, or at an authorized dealer or service location using a controller programming sequence or device, for example.

Figure 3:
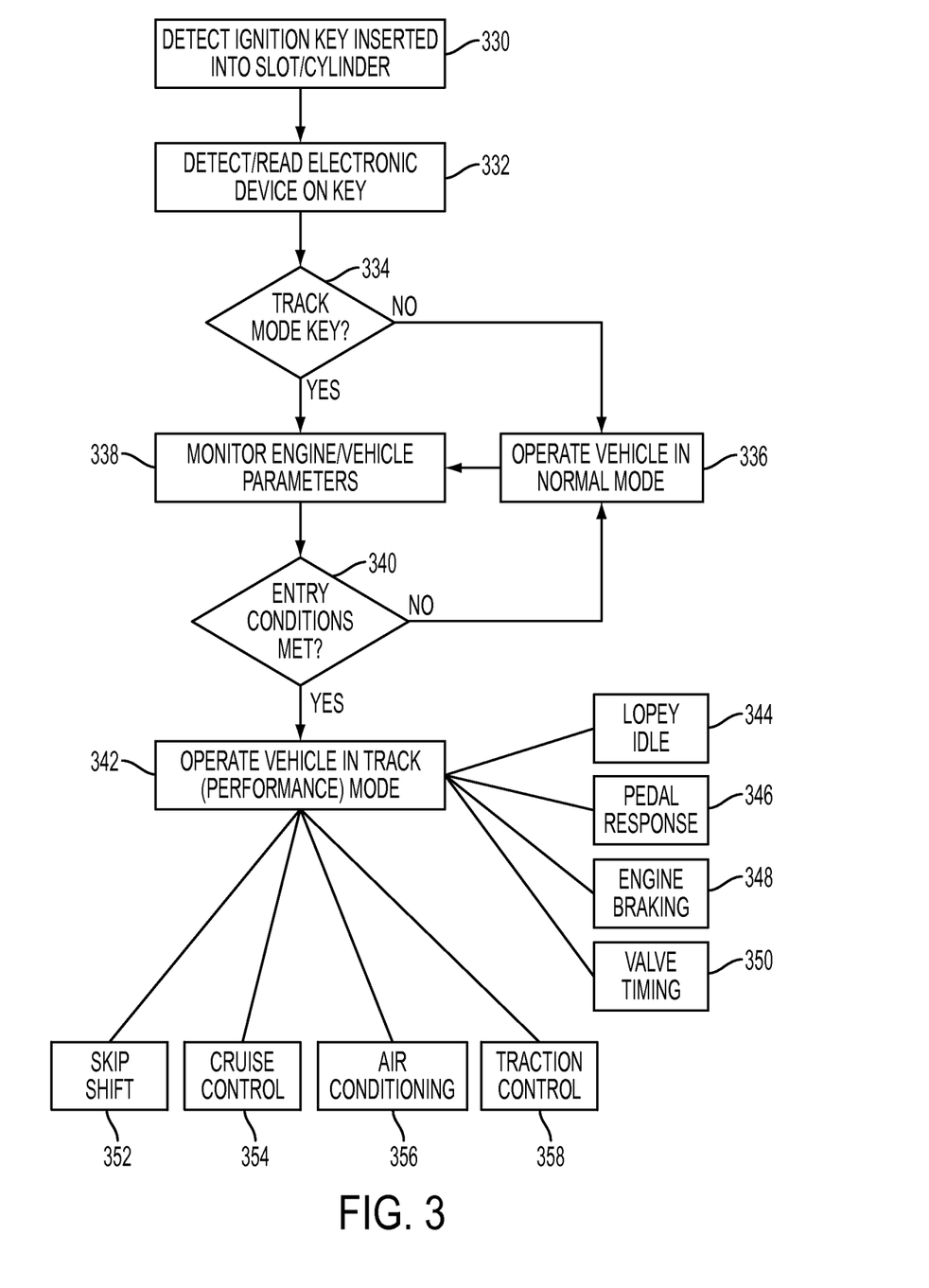
FIG. 3 is a simplified flow chart illustrating operation of a system or method for controlling a vehicle having a performance operating mode according to embodiments of the present disclosure.

As described in greater detail herein with respect to FIG. 3, controller 56 may monitor at least one engine operating parameter to determine whether associated performance mode entry conditions are satisfied. Controller 56 operates engine 12 in the performance mode if the ignition key 190 includes the performance mode identifier and the at least one engine operating parameter satisfies any associated entry conditions. Performance mode operation may include changing engine valve timing by using an associated performance mode VCT table 210 and/or changing idle operation using performance mode idle table 212, changing engine braking using performance mode parameters 214, etc. Performance mode operation may also include disabling features associated with one or more engine/vehicle components or accessories. For example, in one embodiment, a manual transmission skip shift feature (SS) 138 that shifts from first to fourth gear under various operating conditions is disabled when operating in the performance mode. Other accessories that may be modified or disabled include air conditioning (A/C) 132, power steering (PS) 134, and cruise control (CC) 136, for example. For automatic transmission applications, torque converter clutch (TCC) may be disabled and shift points or schedules, shift pressure, and the like may be modified or adjusted when operating in performance mode, for example.

Figure 2:
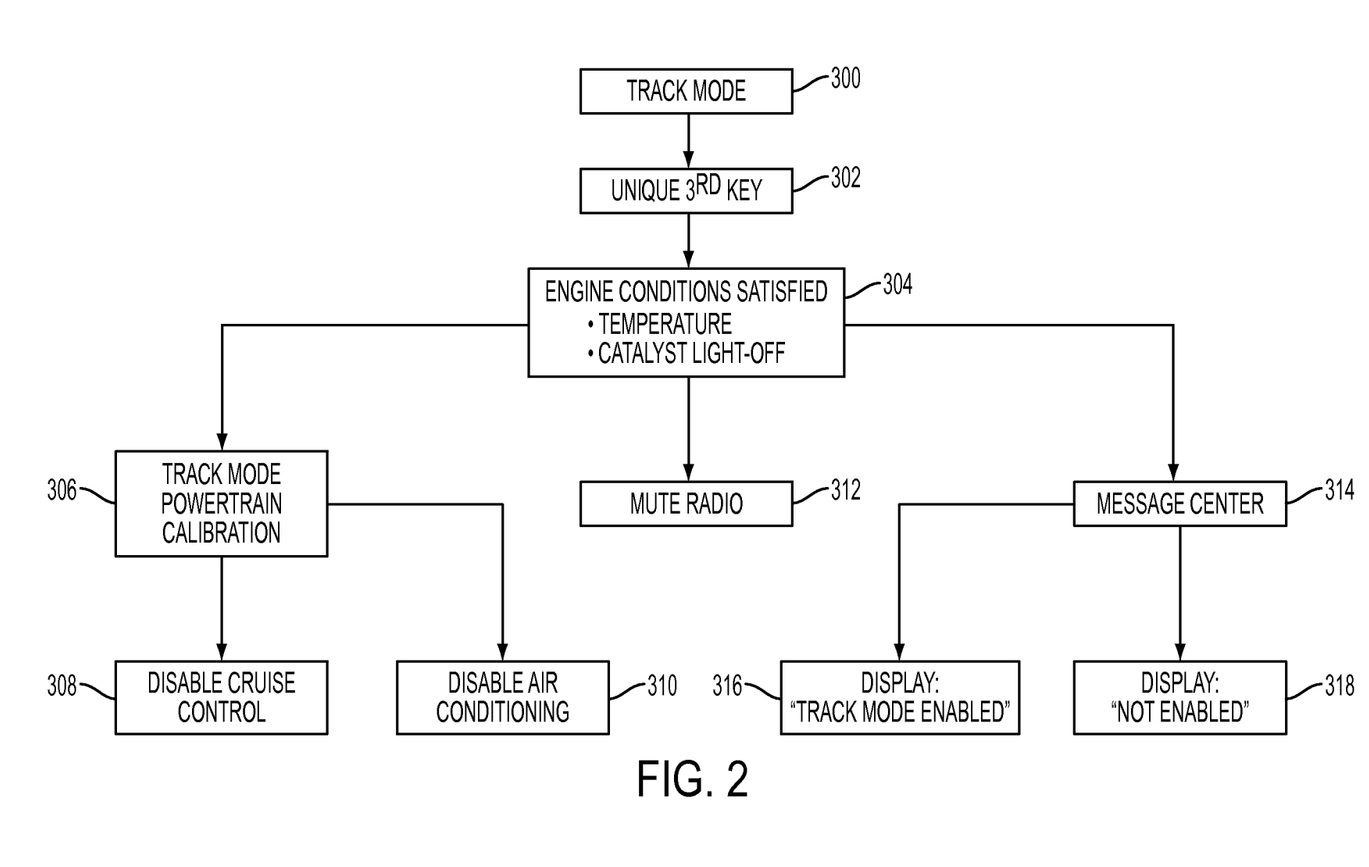
FIG. 2 is a block diagram illustrating vehicle systems that may be included in a key-based performance mode strategy according to embodiments of the present disclosure.

Referring now to FIG. 2, a block diagram illustrating various vehicle systems that may be used in implementing a key-based track mode according to embodiments of the present invention is shown. A performance or track mode 300 may be enabled by detecting a removable key unique to each vehicle associated with the track mode as represented by block 302. In the illustrated embodiment, a unique third ignition key is provided such that the vehicle operator has a normal operating mode key, a valet key, and a track mode key. The removable track mode key is detected when it is placed in an associated ignition key slot or otherwise within range as previously described. In the illustrated embodiment, one or more engine operating conditions are monitored via associated sensors in communication with the engine/vehicle controller to determine whether track mode entry conditions are satisfied as represented by block 304. Representative entry conditions may include an ambient temperature within a corresponding temperature range (such as 30°-90° F.), engine temperature stable, and the emission control devices are within a corresponding operating temperature range, for example. When the track mode has been enabled by a corresponding key or similar device as represented by block 302 and engine/vehicle operating conditions satisfy corresponding entry conditions as represented by block 304, the track mode powertrain calibration is used as represented by block 306. Powertrain calibration 306 may include changing one or more control variables or parameters and/or retrieving values from associated track mode look-up tables as previously described. In addition, one or more vehicle accessories or features may be selectively modified or disabled when operating in track mode. For example, cruise control 308 and air conditioning 310 may be disabled. Other vehicle/engine modes or features may be modified or disabled, such as traction control, variable assist power steering, active suspension, etc. depending on the particular application and implementation.

As also shown in the block diagram of FIG. 2, track mode may mute the radio 312 or disable Bluetooth communications with a cell phone or personal entertainment device, for example. In addition, the vehicle message center 314 may illuminate a light or display an associated message as represented by blocks 316 and 318 to alert the driver to the current status or operating mode. In one embodiment, vehicle message center 314 may be used to enter a password, serial number, code, etc. to enable performance mode operation. The password, serial number or other identification code may be used in combination with a removable key such that both are required to enable performance mode operation. Alternatively, manually entered identification information may be used in place of a removable ignition key in some embodiments.

Referring now to FIG. 3, a simplified block diagram or flow chart is shown illustrating operation of a system or method for controlling a vehicle having normal and performance operating modes according to embodiments of the present disclosure. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in FIG. 3. Similarly, one or more steps or functions may be repeatedly performed, although not explicitly illustrated. Likewise, one or more of the representative steps of functions illustrated may be omitted in some applications or implementations. In one embodiment, the functions illustrated are primarily implemented by software, instructions, code or control logic stored in a computer readable storage medium and executed by a microprocessor-based computer or controller to control operation of the vehicle.

Insertion of a removable key or similar device into a corresponding ignition slot is detected as represented by block 330. Alternatively, a keyless ignition fob or similar device may be detected when within range of the vehicle. Any electronic device or information associated with the inserted key is then detected or read as represented by block 332. In one embodiment, information stored on the key is wirelessly communicated to an associated transceiver disposed within the instrument panel or steering column, for example. Various strategies may be used to distinguish between keys that may be within the vehicle. In one embodiment, a short range wireless communication strategy, such as used with RFID devices, is used to communicate only with the key inserted into the ignition cylinder. For applications that do not include keys with embedded electronic devices or information, the track mode key may include a different profile that is detected by corresponding pins, switches, or tumblers within the ignition key socket. Similarly, a password, key serial number, etc. may be manually entered using a touch screen or keypad.

Information communicated by the removable key or manually entered is processed to determine whether the key is a track mode (performance mode) key as represented by block 334. If the track mode information is not detected, then the vehicle is operated in normal mode as represented by block 336. If the track key information is detected as represented by block 334, one or more engine/vehicle parameters may be monitored to determine whether the track mode entry conditions have been satisfied as represented by blocks 338 and 340. If one or more of the track mode entry conditions have not been satisfied, the vehicle continues to operate in normal mode and monitor corresponding engine/vehicle parameters as represented by blocks 336 and 338, respectively. Entry conditions may be selected to ensure that any emissions requirements are satisfied, for example. Once any entry conditions are satisfied as represented by block 340, the vehicle operates in track (performance) mode as represented by block 342.

Operation in track mode as represented by block 342 may affect various engine/vehicle features such as the valve timing schedule, idle speed control feedback gains (spark/air), torque management gains or time constants associated with the rate of throttle opening/closing, and deceleration or dashpot control gains or time constants to provide a lopey idle 344, more aggressive accelerator pedal response 346, enhanced engine braking 348, and valve timing 350 to increase torque and/or power. Similarly, track mode operation may include modification or disabling of one or more vehicle control features, accessories, or auxiliary equipment. In one embodiment, a manual transmission skip shift function 352 is disabled as well as cruise control 354. Other accessories or features may also be modified or disabled, such as air conditioning 356 and traction control 358. One or more features or accessories may be disabled or modified to enhance vehicle performance when operating in track mode and/or to discourage continued operation in track mode for extended periods of time.

As such, the various embodiments described above may provide associated advantages. For example, selective operation in a performance or track mode allows various compromises to drivability to improve performance on a race track or closed course that may otherwise be undesirable to customers using the vehicle in typical driving scenarios, such as commuting, running errands, or driving on longer road trips. Performance mode enhancements to engine braking, for example, may produce unacceptable noise, vibration, and harshness (NVH) during normal vehicle use. Use of a selectable performance mode accommodates customer expectations for both enhanced performance in the track mode and more acceptable NVH when operating in the normal mode. Use of a removable ignition key or similar device to enable operation in the performance mode or track mode facilitates control of access to the performance mode relative to a permanently installed vehicle switch. A separate ignition key that enables operation in performance mode may also reduce costs associated with lower volume production vehicles. In addition, the performance mode key and associated operation could be provided as an option without custom designs or parts for the vehicle dashboard, console, or other interior components.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments as previously described. Similarly, while the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. Any embodiments described as less desirable than other embodiments or prior art implementations with respect to one or more characteristics are not outside the scope of the disclosure and may be desirable for particular applications.

What is claimed is:

1. A method for controlling a vehicle having a normal mode and a performance mode, the method comprising:
   detecting a removable key unique to each vehicle associated with the performance mode; and
   operating the vehicle in the performance mode in response to detecting the removable key comprising disabling a manual transmission skip-shift feature and operating the vehicle in the normal operating mode otherwise.

2. The method of claim 1 wherein the removable key comprises an ignition key and wherein detecting comprises detecting the removable key being placed in an associated ignition key slot.

3. The method of claim 1 wherein the removable key comprises a keyless ignition fob and wherein detecting comprises detecting the removable key within range of the vehicle.

4. The method of claim 1 wherein the vehicle includes an engine having a variable cam timing device and first and second look-up tables associated with normal cam timing and performance cam timing, respectively, and wherein operating in the performance mode comprises retrieving cam timing values from the associated look-up table.

5. The method of claim 1 wherein operating the vehicle in the performance mode comprises modifying feedback gains associated with engine idle speed control.

6. The method of claim 1 wherein operating the vehicle in the performance mode comprises modifying engine deceleration to increase engine braking in response to detecting a decrease in accelerator pedal position.

7. The method of claim 1 wherein detecting a removable key unique to each vehicle comprises wirelessly communicating information from the removable key to the vehicle.

8. The method of claim 7 wherein wirelessly communicating comprises wirelessly communicating information only when the removable key is inserted into an ignition switch.

9. A method for controlling an engine of a vehicle, comprising:
   detecting an ignition key; and
   operating the engine in a second operating mode by changing valve timing at idle to provide a lopey idle sound if the ignition key includes an identifier to enable operation in the second operating mode, and operating the engine in a first operating mode with valve timing at idle that does not provide a lopey idle sound otherwise.

10. The method of claim 9 further comprising wirelessly detecting information stored on the ignition key when the ignition key is inserted into a key slot.

11. The method of claim 9 further comprising operating a vehicle transmission in a performance mode when operating the engine in the second operating mode.

12. The method of claim 11 wherein operating the vehicle transmission in the performance mode comprises disabling a transmission skip shift feature.

13. The method of claim 9 wherein operating the engine in the second operating mode comprises changing spark and airflow control during engine idle relative to spark and airflow control in the first operating mode for substantially identical operating conditions.

* * * * *